Patented May 14, 1929.

1,713,411

UNITED STATES PATENT OFFICE.

FREIHERR CONWAY von GIRSEWALD, OF FRANKFORT-ON-THE-MAIN, GERMANY.

METHOD FOR MAKING ALUMINUM OXIDE FROM ALUMINUM SULPHIDE.

No Drawing. Application filed February 28, 1928, Serial No. 257,780, and in Germany March 4, 1926.

This invention relates to a method for making aluminum oxide from aluminum sulphide and consists in converting the aluminum sulphide into aluminum oxide according to the following equation:

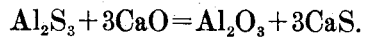

$$Al_2S_3 + 3CaO = Al_2O_3 + 3CaS.$$

According to the invention a mixture of calcium oxide and aluminum sulphide is slightly and partially heated in order to start the reaction, which is completed by the strong heat of reaction produced leading to a glowing of the whole reaction mixture. The heat of reaction is so strong, that the resulting aluminum oxide is practically insoluble in acid. Instead of mixing the solid reaction components and starting the reaction by initial heating of the mass calcium oxide may also be added to molten aluminum sulphide. The obtained product is then crumbly and the calcium sulphide may be extracted therefrom by water and diluted acid. The thus obtained aluminum oxide is a fine powder.

The invention is especially adapted for use in the electrothermal manufacture of pure alumina. According to different well known methods aluminum sulphide and molten alumina are obtained by these electrothermal processes.

Heretofore it has been necessary to treat the product thus obtained with water, thereby converting the aluminum sulphide to aluminum hydroxide, which then had to be separated from the alumina, for instance by elutriation, and then calcined at very high temperatures.

If, however, calcium oxide is added to the melt withdrawn from or present in the electrical furnace, the aluminum sulphide is at once converted into alumina and calcium sulphide. The latter is easily extracted from the obtained product by leaching with water and acid, thus obtaining in one step all the aluminum present in the raw products as pure alumina.

If the reaction should be too vigorous, due to a high content of aluminum sulphide in the melt and especially due to high temperatures, calcium oxide may be partially or wholly replaced by calcium carbonate; the heat necessary for the dissociation of the carbonate ameliorates the heat of reaction of the process.

Example 1.

16 parts of aluminum sulphide are intimately mixed with 18,5 parts of calcium oxide preferably in a finely divided state. The mixture is heated to temperatures of about 800–900° C. and carefully stirred The reaction is vigorous, the whole mass glowing.

If the sintered powder is then boiled first with water and then with hydrochloric acid the residue contains 10.4–10.5 parts of crystallized, nonhydrated alumina. The yield is 96–97%, only 3–4% of aluminum oxide being dissolved by the boiling with acid.

Example 2.

A melt containing an alumina with about 20% of aluminum sulphide is withdrawn from an electric furnace into a reservoir containing about 10% over the theoretical amount of powdered calcium oxide distributed over the bottom of the reservoir. It is preferable to stir the liquid mass once. All the aluminum present as sulphide is then converted into crystalline, non-hydrated alumina. The produced calcium sulphide may easily be removed by washing the product with diluted acids. The alumina is not attacked thereby.

I claim:

1. A process for making aluminum oxide which comprises heating aluminum sulphide with calcium oxide at least to a temperature at which the aluminum sulphide and calcium oxide will react exothermically without any further supply of heat from the outside and removing calcium sulphide from the reaction product by leaching.

2. A process as defined in claim 1, wherein at least a part of the calcium oxide is supplied in the form of calcium carbonate.

3. A process for making aluminum oxide which comprises bringing aluminum sulphide into contact with calcium oxide, at a temperature of at least 800° C. and removing the calcium sulphide from the reaction product by leaching.

4. A process as defined in claim 3, wherein at least a part of the calcium oxide is supplied in the form of calcium carbonate.

5. A process for making aluminum oxide which comprises admixing calcium oxide with molten aluminum sulphide, and removing calcium sulphide from the reaction product by leaching.

6. A process as defined in claim 5, wherein at least a part of the calcium oxide is supplied in the form of calcium carbonate.

7. A process for making aluminum oxide which comprises admixing calcium oxide with a melt containing aluminum sulphide and aluminum oxide, and removing calcium sulphide from the reaction product by leaching.

8. A process as defined in claim 7, wherein at least a part of the calcium oxide is supplied in the form of calcium carbonate.

In testimony whereof I affix my signature.

Dr. FREIHERR CONWAY von GIRSEWALD.